US010977952B2

(12) United States Patent
Shaw et al.

(10) Patent No.: US 10,977,952 B2
(45) Date of Patent: Apr. 13, 2021

(54) INTELLIGENT DRONE TRAFFIC MANAGEMENT VIA RADIO ACCESS NETWORK

(71) Applicant: AT&T INTELLECTUAL PROPERTY I, L.P., Atlanta, GA (US)

(72) Inventors: Venson Shaw, Kirkland, WA (US); Zhi Cui, Sugar Hill, GA (US); Sangar Dowlatkhah, Johns Creek, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 103 days.

(21) Appl. No.: 15/927,900

(22) Filed: Mar. 21, 2018

(65) Prior Publication Data

US 2018/0218617 A1    Aug. 2, 2018

Related U.S. Application Data

(63) Continuation of application No. 14/929,858, filed on Nov. 2, 2015, now Pat. No. 9,940,842.

(51) Int. Cl.
*G08G 5/00* (2006.01)
*B64C 39/02* (2006.01)
*H04W 28/02* (2009.01)

(52) U.S. Cl.
CPC ......... *G08G 5/0043* (2013.01); *B64C 39/024* (2013.01); *G08G 5/0013* (2013.01);
(Continued)

(58) Field of Classification Search
CPC .. G08G 5/0043; G08G 5/0082; G08G 5/0069; G08G 5/0034; G08G 5/0013;
(Continued)

(56) References Cited

U.S. PATENT DOCUMENTS

| 7,737,878 B2 | 6/2010 | van Tooren et al. |
| 8,543,265 B2 | 9/2013 | Ekhaguere et al. |

(Continued)

OTHER PUBLICATIONS

Harris, Mark, "Nasa and Verizon plan to monitor US drone network from phone towers", 3 pages, [online], [retrieved on Jul. 24, 2015]. Retrieved from the Internet: <URL: https://www.theguardian.com/technology/2015/jun/03/verizon-nasa-drones-cellphone-towers>.

(Continued)

*Primary Examiner* — Hunter B Lonsberry
*Assistant Examiner* — Mathew Franklin Gordon
(74) *Attorney, Agent, or Firm* — Amin, Turocy & Watson, LLP (57) ABSTRACT

Concepts and technologies disclosed herein are directed to intelligent drone traffic management via a radio access network ("RAN"). As disclosed herein, a RAN node, such as an eNodeB, can receive, from a drone, a flight configuration. The flight configuration can include a drone ID and a drone route. The RAN node can determine whether capacity is available in an airspace associated with the RAN node. In response to determining that capacity is available in the airspace associated with the RAN node, the RAN node can add the drone ID to a queue of drones awaiting use of the airspace associated with the RAN node. When the drone ID is next in the queue of drones awaiting use of the airspace associated with the RAN node, the RAN node can instruct the drone to fly through at least a portion of the airspace in accordance with the drone route.

20 Claims, 8 Drawing Sheets

(52) U.S. Cl.
CPC ......... *G08G 5/0034* (2013.01); *G08G 5/0069* (2013.01); *G08G 5/0082* (2013.01); *H04W 28/0247* (2013.01); *B64C 2201/024* (2013.01); *B64C 2201/146* (2013.01); *B64C 2201/162* (2013.01)

(58) Field of Classification Search
CPC ........ B64C 2201/162; B64C 2201/146; B64C 2201/024; B64C 39/024; H04W 28/0247
See application file for complete search history.

(56) References Cited

U.S. PATENT DOCUMENTS

| | | | |
|---|---|---|---|
| 8,744,738 | B2 | 6/2014 | Bushnell |
| 9,087,451 | B1 | 6/2015 | Jarrell |
| 9,671,791 | B1* | 6/2017 | Paczan ................. B64C 39/024 |
| 9,997,080 | B1* | 6/2018 | Chambers ............. G08G 5/045 |
| 2009/0118875 | A1 | 5/2009 | Stroud |
| 2010/0121574 | A1 | 5/2010 | Ariyur et al. |
| 2011/0093134 | A1 | 4/2011 | Emanuel et al. |
| 2014/0166817 | A1 | 6/2014 | Levien et al. |
| 2014/0303814 | A1* | 10/2014 | Burema ............... A01B 79/005 701/3 |
| 2014/0349630 | A1* | 11/2014 | Hyde ..................... H04B 7/026 455/418 |
| 2015/0142211 | A1 | 5/2015 | Shehata et al. |
| 2015/0302123 | A1* | 10/2015 | Gloss ................... H04W 16/30 703/13 |
| 2015/0327136 | A1* | 11/2015 | Kim ..................... H04W 36/08 370/331 |
| 2016/0313736 | A1* | 10/2016 | Schultz ................. B64D 47/08 |

OTHER PUBLICATIONS

Closson, Kevin, "Air Traffic Control . . . For Drones", 4 pages, [online], [retrieved on Jul. 24, 2015]. Retrieved from the Internet: <URL: http://nerac.com/air-traffic-controlfor-drones/>.
Non-Final Office Action received for U.S. Appl. No. 14/929,858 dated Feb. 22, 2017, 30 pages.
Final Office Action received for U.S. Appl. No. 14/929,858 dated Jul. 24, 2017, 33 pages.

* cited by examiner

INTELLIGENT DRONE TRAFFIC MANAGEMENT VIA RADIO ACCESS NETWORK

CROSS-REFERENCE TO RELATED APPLICATIONS

The present application is a continuation of U.S. patent application Ser. No. 14/929,858 filed Nov. 2, 2015 and entitled "Intelligent Drone Traffic Management via Radio Access Network," which is hereby incorporated by reference in its entirety.

BACKGROUND

Unmanned aerial vehicles ("UAVs"), commonly known as drones, include aircraft capable of flight without a human pilot onboard. Drones come in a variety of shapes and sizes and utilize different designs to achieve flight. Drones are becoming increasingly popular in government operations, civil operations, and even recreational/hobbyist use. Integrating drone flight with other aircraft and addressing safety and privacy concerns are all topics currently being considered by local, state, and federal governments to ensure the benefit of drones in a variety of applications can be safely implemented into society.

SUMMARY

Concepts and technologies disclosed herein are directed to intelligent drone traffic management via a radio access network ("RAN"). According to one aspect of the concepts and technologies disclosed herein, a RAN node, such as an eNodeB, can receive, from a drone, a flight configuration. The flight configuration can include a drone ID and a drone route. The RAN node can determine whether capacity is available in an airspace associated with the RAN node. In response to determining that capacity is available in the airspace associated with the RAN node, the RAN node can add the drone ID to a queue of drones awaiting use of the airspace associated with the RAN node. When the drone ID is next in the queue of drones awaiting use of the airspace associated with the RAN node, the RAN node can instruct the drone to fly through at least a portion of the airspace in accordance with the drone route.

In some embodiments, the flight configuration also can include a priority flag indicating whether the drone is to be given priority in the queue of drones awaiting use of the airspace associated with the RAN node. In these embodiments, the RAN node can, in response to determining that capacity is available in the airspace associated with the radio access network node, determine whether the drone is priority eligible based upon the priority flag; and, in response to determining that the drone is priority eligible, the RAN node can prioritize the drone ID in the queue.

In some embodiments, the RAN node can, in response to determining the drone ID is not next in the queue, instruct the drone to enter a holding pattern in a designated portion of the airspace associated with the radio access network node. The RAN node can release the drone from the holding pattern upon the drone ID becoming next in the queue. The queue can schedule multiple drones per queue space so that being next in the queue can constitute being one of a plurality of drones considered next in the queue.

In some embodiments, the RAN node can, in response to determining that capacity is not available in the airspace associated with the RAN node, instruct the drone to proceed to a different RAN node. In these embodiments, the RAN node can perform a handover of communications with the drone to the different RAN node.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to intelligent drone traffic management via a radio access network ("RAN"). According to one aspect of the concepts and technologies disclosed herein, a RAN node, such as an eNodeB ("eNB"), can receive, from a drone, a flight configuration. The flight configuration can include a drone ID and a drone route. The RAN node can determine whether capacity is available in an airspace associated with the RAN node. In response to determining that capacity is available in the airspace associated with the RAN node, the RAN node can add the drone ID to a queue of drones awaiting use of the airspace associated with the RAN node. When the drone ID is next in the queue of drones awaiting use of the airspace associated with the RAN node, the RAN node can instruct the drone to fly through at least a portion of the airspace in accordance with the drone route.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including handheld devices, Drones, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of intelligent drone traffic management via a RAN will be presented.

Figure 1:
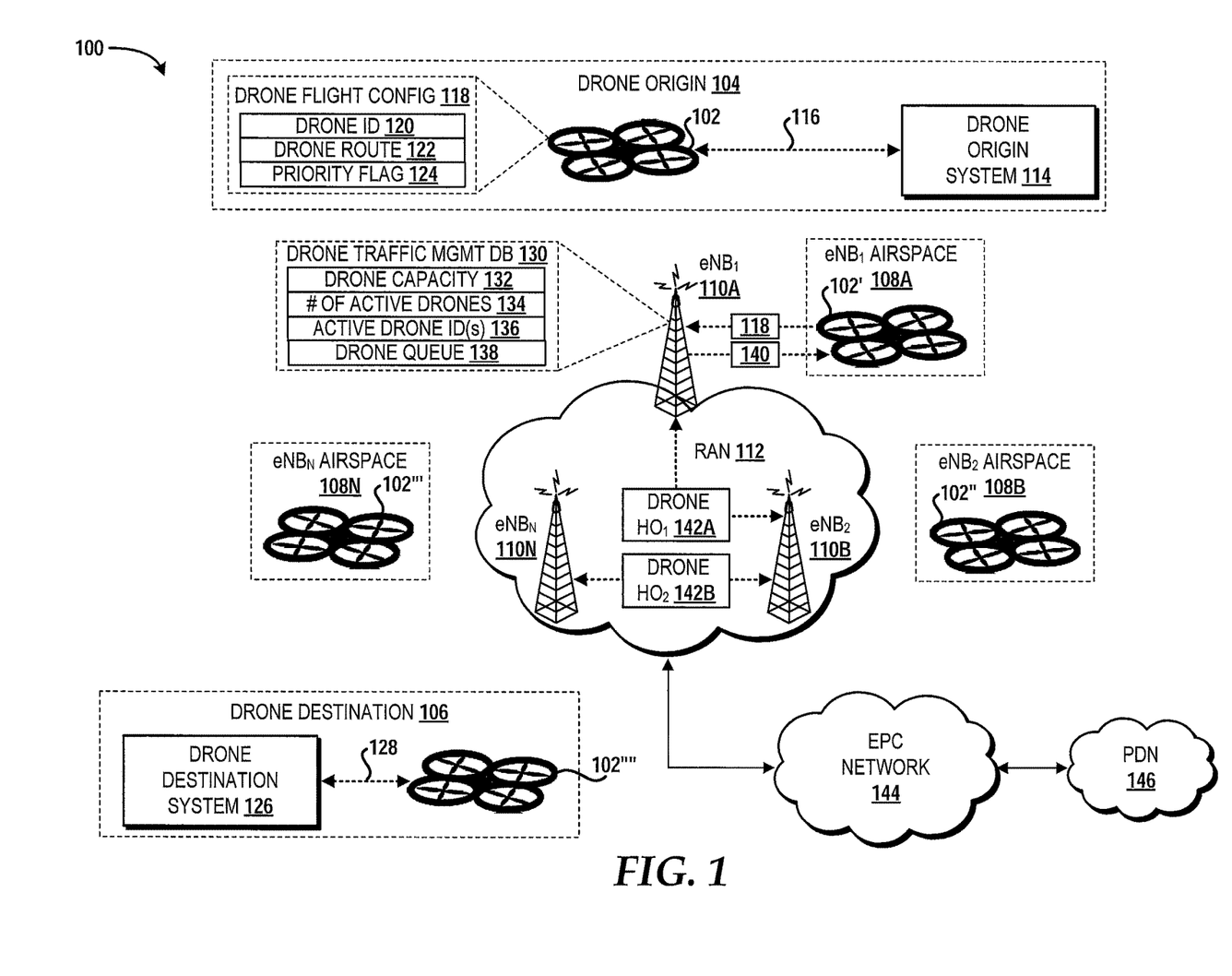
FIG. 1 is a block diagram illustrating aspects of an illustrative operating environment for various concepts disclosed herein.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a drone 102, also referred to as an unmanned aerial vehicle ("UAV"). As used herein, a "drone" is defined as an unmanned aircraft that can navigate autonomously during flight. Autonomous flight is used herein to refer to flight without human control. In some embodiments, the drone 102 can be remotely controlled by a human user for flight testing, maintenance, emergency landings, or for other reasons. For example, the drone 102 might include an operational setting that allows control to be handed over to a human. This control can be via line of sight or beyond line of sight utilizing one or more cameras installed on the drone 102 for sight. Those skilled in the art will appreciate the wide range of control options suitable for controlling the drone 102 during the aforementioned use cases and others.

The drone 102 can be any shape and size, and can utilize any design to achieve flight. In some embodiments, the drone 102 is a fixed-wing aircraft. In some other embodiments, the drone 102 is a rotary-wing aircraft. In some other embodiments, the drone 102 is an ornithopter. Those skilled in the art will appreciate the wide range of propulsion systems that can be utilized by the drone 102.

The drone 102 can perform flights for various use cases. It should be understood that the concepts and technologies disclosed herein are not limited to any specific use case, and while some specific use cases are mentioned herein, the concepts and technologies disclosed herein are not limited thereto. Some common use cases include agriculture operations, forest health monitoring operations, firefighting operations, land and environment surveying operations, weather monitoring operations, traffic monitoring operations, wildlife surveying operations, geological surveying operations, structural inspection operations, search and rescue operations, delivery operations (e.g., food delivery, product delivery, and the like), security operations, disaster response operations, and the like.

In the illustrated example, the drone 102 flies from a drone origin location ("drone origin") 104 to a drone destination location ("drone destination") 106. During the flight, the drone 102 can navigate into eNB airspaces 108A-108N (collectively, "eNB airspaces 108") corresponding to one or more eNBs 110A-110N (collectively, "eNBs 110") operating as part of a RAN 112 as will be described in greater detail herein. The drone 102 can fly with or without a payload.

The drone origin 104 includes a drone origin system 114. The drone 102 can communicate with the drone origin system 114 via a drone-origin system connection 116 to receive a drone flight configuration 118 as part of a pre-flight preparation process. The pre-flight preparation process can include programming the drone 102 with the drone flight configuration 118 via the drone-origin system connection 116. In some embodiments, the drone origin system 114 receives input from a user (not shown), wherein the input includes at least a portion of the drone flight configuration 118. In some other embodiments, the drone origin system 114 automatically generates at least a portion of the drone flight configuration 118 based upon information provided by an application executing on the drone origin system 114 or another system (not shown). For example, a shipping application can receive input of a delivery address for a particular package.

The drone-origin system connection 116 can be a wired or wireless connection utilizing any standardized or proprietary connection protocol. Some example protocols include, but are not limited to, WI-FI, WIMAX, BLUETOOTH, infrared, infrared data association ("IRDA"), near field communications ("NFC"), other RF technologies, Ethernet, Universal Serial Bus ("USB"), and the like.

The drone origin system 114 can be or can include a computing device, such as a tablet computing device, a personal computer ("PC"), a desktop computer, a laptop computer, a notebook computer, a cellular phone or smartphone, other mobile computing devices, a personal digital assistant ("PDA"), or the like. Example architectures of the drone origin system 114 are illustrated and described herein below with reference to FIGS. 6 and 7. The functionality of the drone origin system 114 can be provided, at least in part, by a cloud-based computing platform that can be provided by one or more application servers, web servers, data storage systems, network appliances, dedicated hardware devices, and/or other server computers or computing devices, which might, in some embodiments, leverage compute, memory, and/or other resources of a virtualization platform to perform operations described herein. In light of the above alternative embodiments of the drone origin system 114, it should be understood that this example is illustrative and should not be construed as being limiting in any way.

The illustrated drone flight configuration 118 includes a drone ID 120, a drone route 122, and a priority flag 124. The drone ID 120 is used to uniquely identify the drone 102. In some embodiments, the drone ID 120 is a temporary identifier assigned by the drone origin system 114 for one or more flights. In some other embodiments, the drone ID 120 is a permanent identifier assigned by the drone origin system 114, a manufacturer, or another entity. The drone ID 120 can include one or more letters, one or more numbers, one or more characters, one or more punctuation marks, one or more symbols, any combination thereof, and/or the like. In some embodiments, the drone ID 120 includes a permanent user equipment ("UE") identifier, such as an International Mobile Subscriber Identity ("IMSI") and/or an International Mobile Equipment Identity ("IMEI").

The drone route 122 includes a route from the drone origin 104 to the drone destination 106. The drone route 122 can include two or more waypoints, including a start waypoint (such as a location that includes the drone origin 104), a finish waypoint (such as a location that includes the drone destination 106), and, optionally, one or more en route waypoints (such as one or more of the locations in which the eNBs 110 reside). The waypoints can be Global Positioning System ("GPS") waypoints described in terms of latitude and longitude coordinates and an altitude. Moreover, a waypoint can include a range of latitude coordinates, a range of longitude coordinates, a range of altitudes, or some combination thereof. In some embodiments, the waypoints correspond to the eNBs 110 such that, for example, the drone route 122 consists of a series of hops from the $eNB_1$ 110A to the $eNB_2$ 110B to the $eNB_N$ 110N.

The priority flag 124 includes an indication of whether or not the drone 102 should be given priority over one or more other drones (not shown) for access to the eNB airspaces 108A-108N corresponding to the eNBs 110A-110N, respectively. The airspaces 108A-108N can include any area served by the eNBs 110A-110N, respectively. For example, the typical range of an eNB in accordance with current Long-Term Evolution ("LTE") standards is between two and three miles radially. Vertical coverage is typically less and may reduce the coverage area that constitutes the eNB airspaces 108A-108N. In some embodiments, one or more of the eNBs 110 can be configured or modified to support greater lateral and/or vertical coverage via antenna modifications (e.g., raising the height of the antenna or increasing the available power), changing frequencies, and/or other configurations/modifications those skilled in the art would appreciate to increase the coverage area radially and/or vertically.

The illustrated drone destination 106 includes a drone destination system 126 that can interact with the drone 102, via a drone-destination system connection 128, to access the drone flight configuration 118. The drone destination system 126 also can access a flight summary (not shown) that can include, for example, data collected during the flight (e.g., speed, altitude, and/or other sensor data; audio, video, and/or still images; battery utilization; and the like). The drone-destination system connection 128 can be a wired or wireless connection utilizing any standardized or proprietary connection protocol. Some example protocols include, but are not limited to, WI-FI, WIMAX, BLUETOOTH, infrared, IRDA, NFC, other RF technologies, Ethernet, USB, and the like.

The drone destination system 126 can be or can include a computing device, such as a tablet computing device, a PC, a desktop computer, a laptop computer, a notebook computer, a cellular phone or smartphone, other mobile computing devices, a PDA, or the like. Example architectures of the drone destination system 126 are illustrated and described herein below with reference to FIGS. 6 and 7. The functionality of the drone destination system 126 can be provided, at least in part, by a cloud-based computing platform that can be provided by one or more application servers, web servers, data storage systems, network appliances, dedicated hardware devices, and/or other server computers or computing devices, which might, in some embodiments, leverage compute, memory, and/or other resources of a virtualization platform to perform operations described herein. In light of the above alternative embodiments of the drone destination system 126, it should be understood that this example is illustrative and should not be construed as being limiting in any way.

The drone destination system 126 can function as the drone origin system 114, or vice versa depending upon whether the system is functioning as the destination or origin for the drone 102. For example, after arrival at the drone destination 106, the drone 102"" can receive a new route from the drone destination system 126 that is functioning as an origin system. In other words, the terms "origin" and "destination" for the systems 114/126 are dependent upon the drone route 122 and do not necessarily limit the functionality to operations described herein as being performed, in particular, by the drone origin system 114 or the drone destination system 126.

The RAN 112, can include one or more service areas (which may also be referred to herein as "cells") having the same or different cell sizes, which may be represented by different cell-types. As used herein, a "cell" refers to a geographical area that is served by one or more base stations, such as the eNBs 110, operating within an access network. The cells within the RAN 112 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNB), pico cell-type, and micro cell-type, in general contrast to a macro cell-type, which offers a larger coverage area. Other cell-types, including proprietary cell-types and temporary cell-types are also contemplated.

The RAN 112 might operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 112 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the drone 102. Data communications can be provided in part by the RAN 112 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 112 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like.

As used herein, a "base station" refers to a radio receiver and/or transmitter (collectively, transceiver) that is/are configured to provide a radio/air interface over which one or more drones, such as the drone 102, can connect to a network. Accordingly, a base station is intended to encompass one or more base transceiver stations ("BTSs"), one or more NBs, one or more eNBs, one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the drone 102. The illustrated embodiment shows base stations embodied as the eNBs 110. This embodiment is illustrative and should not be construed as being limiting in any way.

In the illustrated embodiment, the $eNB_1$ 110A is shown with a drone traffic management database 130. The drone traffic management database 130 can store a drone capacity 132, a number of active drones 134, one or more drone IDs for active drone(s) ("active drone ID(s)") 136, and a drone queue 138. The drone capacity 132 includes a maximum number of drones that can operate within an associated airspace (in the illustrated example, the $eNB_1$ airspace 108A). The number of active drones 134 includes a current number of drones operating within the associated airspace. The active drone ID(s) 136 includes the drone ID(s) for the active drone(s). For example, if the drone 102 is the only drone operating within the $eNB_1$ 110A, the number of active drones 134 can be set to one and the active drone ID(s) 136 can include the drone ID 120. The drone queue 138 includes a queue of one or more drone IDs associated with drones that are awaiting entry into the $eNB_1$ airspace 108A. In some embodiments, queued drones can be instructed to enter a holding pattern in a designated portion of the $eNB_1$ airspace 108A. The $eNB_2$ 110B and the $eNB_N$ 110N each can include an instance of the drone traffic management database 130 particular thereto. As such, the drone capacity 132, the number of active drones 134, the active drone ID(s) 136, and the drone queue 138 can differ among the eNBs 110.

When the drone 102 arrives in one of the airspaces 108, the drone 102 sends the drone flight configuration 118 to the associated one of the eNBs 110. In the illustrated example, the drone 102 leaves the drone origin 104 and arrives in the $eNB_1$ airspace 108A (illustrated as the drone 102'). The drone 102' provides the drone flight configuration 118 to the $eNB_1$ 110A, and in response, the $eNB_1$ 110A can generate a set of flight instructions 140 utilized by the $eNB_1$ 110A to instruct the drone 102' regarding how to proceed during the flight. The set of flight instructions 140 can instruct the drone 102' to enter a holding pattern until further notice. The set of flight instructions 140 can instruct the drone 102' to fly through at least a portion of the $eNB_1$ airspace 108A in accordance with the drone route 122. The set of flight instructions 140 can instruct the drone 102' to fly to a different airspace, such as, in the illustrated example, the $eNB_2$ airspace 108B. In the illustrated example, the drone 102' leaves the $eNB_1$ airspace 108A and arrives in the $eNB_2$ airspace 108B (illustrated as the drone 102"). In this scenario, the $eNB_1$ 110A can handover communications with the drone 102' to the $eNB_2$ 110B (shown generally as drone $HO_1$ 142A), and similarly, the $eNB_2$ 110B can handover communications with the drone 102" to the $eNB_N$ 110N (shown generally as drone $HO_2$ 142B) when the drone 102" leaves the $eNB_2$ airspace 108B and arrives in the $eNB_N$ airspace 108N (illustrated as the drone 102'").

The RAN 112 is shown as being in communication with an evolved packet core ("EPC") network 144. The EPC network 144 can include one or more mobility management entities ("MME"; not shown), one or more serving gateways ("SGWs"; not shown), one or more packet data networks ("PDN") gateways ("PGWs"; not shown), and one or more home subscriber servers ("HSSs"; not shown). An MME controls signaling related to mobility and security for E-UTRAN access, such as via the RAN 112, by the drone 102 as well as other UEs, such as mobile phones, tablets, and the like (not shown). The SGW(s) provides a point of interconnect between the radio-side (e.g., the RAN 112) and the EPC network 144. An SGW serves the drone 102 (and other drones and UEs not shown) by routing incoming and outgoing IP packets. A PGW interconnects the EPC network 144 and one or more external IP networks, shown in the illustrated embodiment as a PDN 146. A PGW routes IP packets to and from the PDN 146. A PGW also performs operations such as IP address/IP prefix allocation, policy control, and charging. In some implementations, a PGW and an SGW are combined. An HSS is a database that contains user/subscriber information. An HSS also performs operations to support mobility management, call and session setup, user authentication, and access authorization.

It should be understood that some implementations of the operating environment 100 include multiple drones 102, multiple drone origins 104, multiple drone destinations 106, one or more RANs 112, one or more drone origin systems 114, one or more drone-origin system connections 116, one or more drone flight configurations 118, one or more drone IDs 120, one or more drone routes 122, one or more priority flags 124, one or more drone destination systems 126, one or more drone-destination system connections 128, one or more drone traffic management database 130, one or more drone queues 138, one or more sets of flight instructions 140, one or more EPC networks 144, one or more PDNs 146, or some combination thereof. Thus, the illustrated embodiment should be understood as being illustrative, and should not be construed as being limiting in any way.

Figure 2:
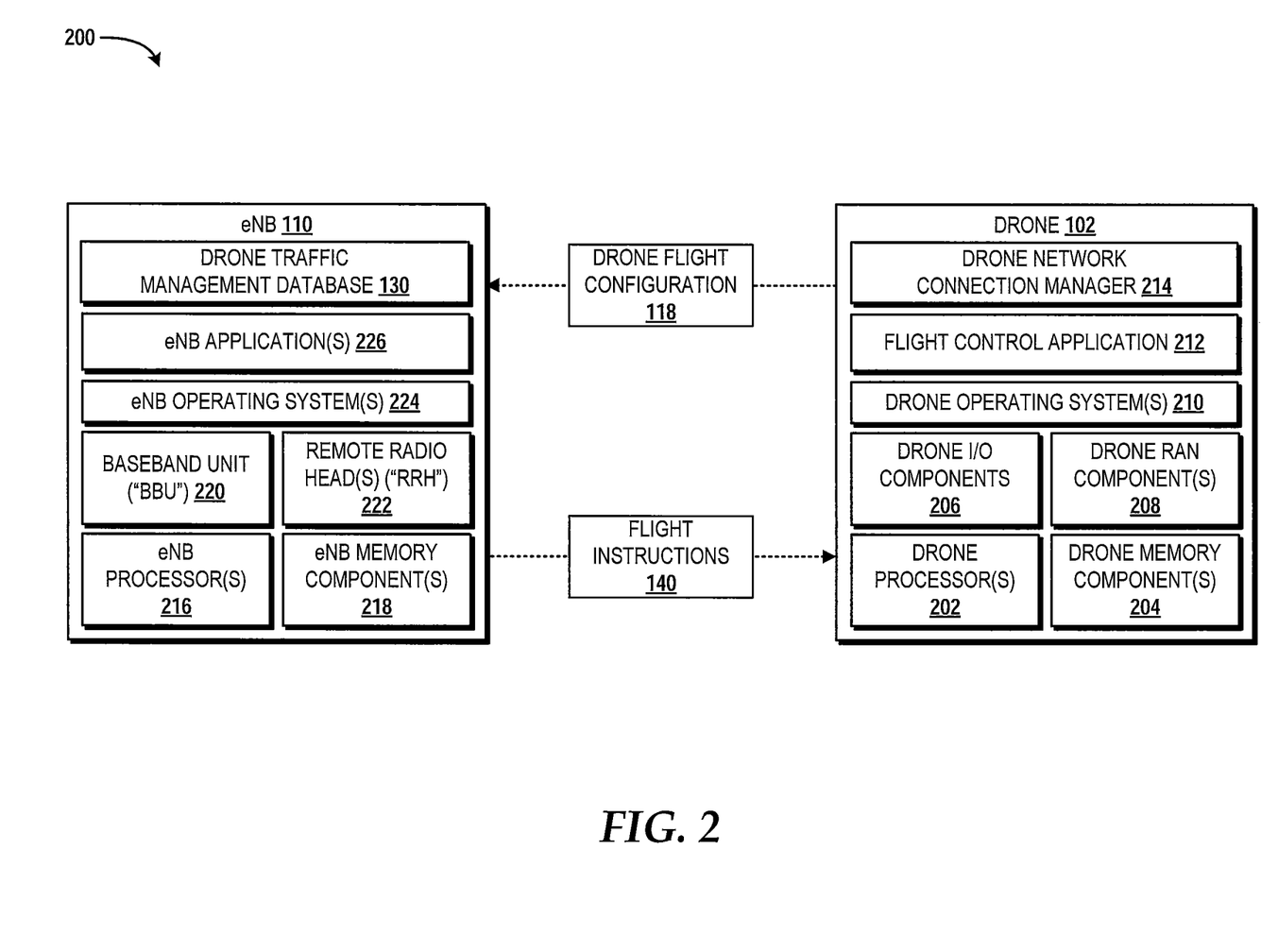
FIG. 2 is a block diagram illustrating aspects of an illustrative drone in communication with an illustrative eNode-B ("eNB"), according to an illustrative embodiment of the concepts and technologies disclosed herein.

Turning now to FIG. 2, a block diagram illustrating aspects (generally shown at 200) of an illustrative drone, such as the drone 102, in communication with an illustrative eNB, such as one of the eNBs 110, will be described according to an illustrative embodiment of the concepts and technologies disclosed herein. The illustrated drone 102 includes one or more drone processors 202, one or more drone memory components 204, one or more drone input/output ("I/O") components 206, one or more drone RAN components 208, one or more drone operating systems 210, a flight control application 212, and a drone network connection manager 214.

The drone processor(s) 202 can include a central processing unit ("CPU") configured to process data, execute computer-executable instructions of one or more application programs, and communicate with other components of the drone 102 in order to perform various functionality described herein. The drone processor(s) 202 may be utilized to execute aspects of the drone operating system(s) 210 and the flight control application 212. In some embodiments, the drone processor(s) 202 is, or is included in, a system-on-chip ("SoC") along with one or more of the other components described herein below. For example, the SoC may include the drone processor(s) 202, a GPU, and the drone RAN component(s) 208. In some embodiments, the drone processor 200 is fabricated, in part, utilizing a package-on-package ("PoP") integrated circuit packaging technique. Moreover, the drone processor(s) 202 may be a single core or multi-core processor. The drone processor(s) 202 may be created in accordance with an ARM architecture, available for license from ARM HOLDINGS of Cambridge, United Kingdom. Alternatively, the drone processor(s) 202 may be created in accordance with an x86 architecture, such as is available from INTEL CORPORATION of Mountain View, Calif. and others. In some embodiments, the drone processor(s) 202 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The drone memory component(s) 204 can include a random access memory ("RAM"), a read-only memory ("ROM"), an integrated storage memory ("integrated storage"), and a removable storage memory ("removable storage"), or some combination thereof. In some embodiments, the drone memory component(s) 204 are included as part of the drone processor(s) 202. In some embodiments, the drone memory component(s) 204 store the drone operating system(s) 210 or a portion thereof (e.g., operating system kernel or bootloader), the flight control application 212, and the drone network connection manager 214.

The drone network connection manager 214 can manage all or a portion of the network connections available to the drone 102 at a given time. The network connections can include, for example, connections established via the drone RAN components 208, which may be or may include one or more cellular radios and/or other radios suited for the radio access technologies described herein above. In some embodiments, the drone network connection manager 214 is included as part of the drone operating system(s) 210.

The drone operating system 210 is a program for controlling the operation of the drone 102. The drone operating system 210 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The flight control application 212 is an application executable by the drone processor(s) 202 to control flight of the drone 102. The flight control application 212 can utilize the drone flight configuration 118 and the set of flight instructions ("flight instructions") 140 received from the eNB 110 to determine the trajectory of the drone 102 and manipulate various mechanical components (not shown) of the drone 102 to enable flight. The flight control application 212 also can provide an interface through which the drone origin system 114 and the drone destination system 126 can communicate with the drone 102. For example, the drone flight configuration 118 can be loaded onto the drone 102 via the flight control application 212.

The illustrated eNB 110 includes one or more eNB processors 216, one or more eNB memory components 218, a baseband unit ("BBU") 220, one or more remote radio heads ("RRHs") 222, one or more eNB operating systems 224, and one or more eNB applications 226. Each of these components will now be described in detail.

The eNB processor(s) 216 can include one or more processing units configured to process data, execute computer-executable instructions of one or more application programs, and communicate with other components of the eNB 110 in order to perform various functionality described herein. The eNB processor(s) 216 may be utilized to execute aspects of the eNB operating system(s) 224 and the eNB application(s) 226. In some embodiments, the eNB processor(s) 216 is or includes a CPU, a communications processor, or a FPGA. In some embodiments, the eNB processor(s) 216 is, or is included in, a SoC along with one or more of the other components described herein below. For example, the SoC may include the eNB processor(s) 216, a GPU, the BBU 220, the RRH(s) 222, or some combination thereof. In some embodiments, the eNB processor(s) 216 is fabricated, in part, utilizing a PoP integrated circuit packaging technique. Moreover, the eNB processor(s) 216 may be a single core or multi-core processor. The eNB processor(s) 216 may be created in accordance with an ARM architecture, available for license from ARM HOLDINGS of Cambridge, United Kingdom. Alternatively, the eNB processor(s) 216 may be created in accordance with an x86 architecture, such as is available from INTEL CORPORATION of Mountain View, Calif. and others. In some embodiments, the eNB processor(s) 216 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an OMAP SoC, available from TEXAS INSTRUMENTS of Dallas, Tex., a customized version of any of the above SoCs, or a proprietary SoC.

The eNB memory component(s) 218 can include a RAM, a ROM, an integrated storage memory, and a removable storage memory, or some combination thereof. In some embodiments, the eNB memory component(s) 218 are included as part of the eNB processor(s) 216. In some embodiments, the eNB memory component(s) 218 store the eNB operating system(s) 224 or a portion thereof (e.g., operating system kernel or bootloader), the eNB application(s) 226, and the drone traffic management database 130.

The BBU 220 is the baseband processing unit of the eNB 110. The BBU 220 can include other components shown, including, for example, the eNB processor(s) 216, the eNB memory component(s) 218, the eNB operating system(s) 224, the eNB application(s) 226, or some combination thereof. The BBU 220 can receive IP packets received from the EPC network 144 (shown in FIG. 1) and can modulate the IP packets into digital baseband signals. The BBU 220 can send the digital baseband signals to the RRH(s) 222. The digital baseband signals received from the RRH(s) 222 are demodulated and IP packets are transmitted to the EPC network 144. The RRH(s) 222 can transmit and receive wireless signals from the drone 102, including, for example, a signal carrying the drone flight configuration 118 and a signal carrying the flight instructions 140. The RRH(s) 222 also can convert the digital baseband signals from the BBU 220 that have been subjected to protocol-specific processing into RF signals and power amplifies the signals for transmission to the drone 102. The RF signals received from the drone 102 are amplified and converted to digital baseband signals for transmission to the BBU 220.

The eNB operating system(s) 224 is a program for controlling the operation of the eNB 110. The eNB operating system(s) 224 can include a proprietary operating system, an embedded operating system, a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The eNB application(s) 226 can be any application that performs operations for the eNB 110. For example, the eNB application(s) 226 can be or can include software compliant with 3GPP standards for call control processing, performance management, self-organizing network functions, and the like. The eNB application(s) 226 also can be or can include software for interacting with the drone 102, including software for generating the flight instructions 140. Additional details regarding operations that can be performed by the eNB application(s) 226 are described herein with regard to FIGS. 4A, 4B, and 5.

Figure 3:
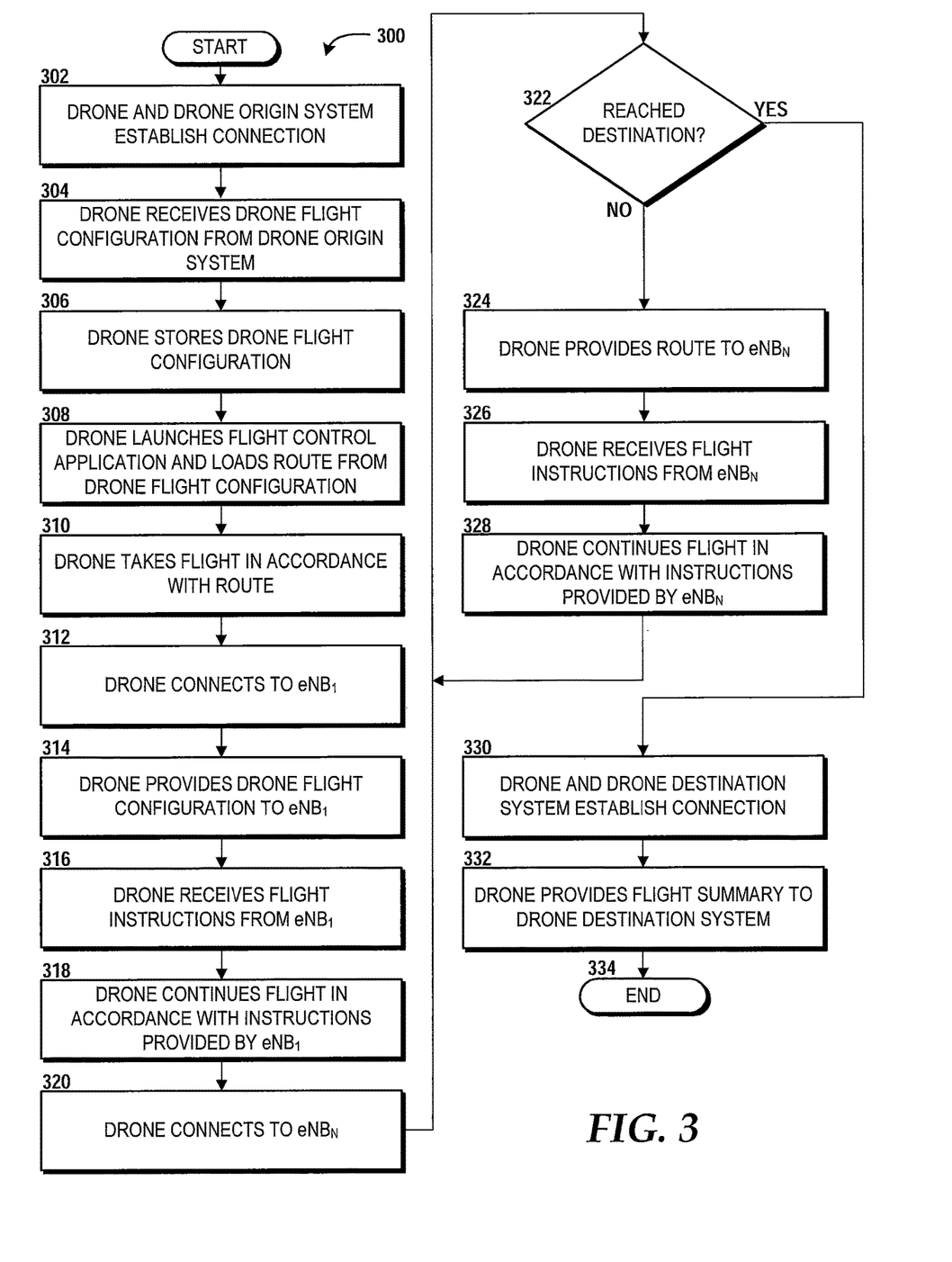
FIG. 3 is a flow diagram illustrating aspects of a method for operating a drone, according to an illustrative embodiment of the concepts and technologies disclosed herein.

Turning now to FIG. 3, a flow diagram illustrating aspects of a method 300 for operating a drone, such as the drone 102, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the drone 102, the eNBs 110, the drone origin system 114, the drone destination system 126, and/or one or more other computing systems and/or devices disclosed herein to perform operations.

For purposes of illustrating and describing some of the concepts of the present disclosure, the methods disclosed herein are described as being performed, in part, by the drone 102, the eNBs 110, the drone origin system 114, and/or the drone destination system 126, via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 1 and further reference to FIG. 3. The method 300 begins and proceeds to operation 302, where the drone 102 and the drone origin system 114 establish a connection (i.e., the drone-origin system connection 116) over which the drone origin system 114 can configure the drone 102 for flight to the drone destination 106. From operation 302, the method 300 proceeds to operation 304, where the drone 102 receives the drone flight configuration 118 from the drone origin system 114. From operation 304, the method 300 proceeds to operation 306, where the drone 102 stores the drone flight configuration 118.

From operation 306, the method 300 proceeds to operation 308, where the drone 102 launches the flight control application 212 and loads the drone route 122 from the drone flight configuration 118. From operation 308, the method 300 proceeds to operation 310, where the drone 102 takes flight in accordance with the drone route 122.

From operation 310, the method 300 proceeds to operation 312, where the drone 102 connects to the eNB$_1$ 110A. From operation 312, the method 300 proceeds to operation 314, where the drone 102 provides the drone flight configuration 118 to the eNB$_1$ 110A. From operation 314, the method 300 proceeds to operation 316, where the drone 102 receives the flight instructions 140 from the eNB$_1$ 110A. From operation 316, the method 300 proceeds to operation 318, where the drone 102 continues flight in accordance with the flight instructions 140.

From operation 318, the method 300 proceeds to operation 320, where the drone 102 connects to the eNB$_N$ 110N. From operation 320, the method 300 proceeds to operation 322, where the drone 102 determines whether the destination specified in the drone route 122 has been reached. If the drone 102 determines that the destination has not been reached, the method 300 proceeds to operation 324, where the drone 102 provides the drone route 122 to the eNB$_N$ 110N. From operation 324, the method 300 proceeds to operation 326, where the drone 102 receives the flight instructions 140 from the eNB$_N$ 110N. From operation 326, the method 300 proceeds to operation 328, where the drone 102 continues the flight in accordance with the flight instructions 140 provided by eNB$_N$ 110N. From operation 328, the method 300 returns to operation 322. Operations 322-328 are repeated until the drone 102 reaches the drone destination 106.

When the drone 102 reaches the drone destination 106, the method 300 proceeds from operation 322 to operation 330, where the drone 102 and the drone destination system 126 establish a connection (i.e., the drone-destination system connection 128. From operation 330, the method 300 proceeds to operation 332, where the drone 102 provides a flight summary to the drone destination system 126. From operation 332, the method 300 proceeds to operation 334, where the method 300 ends.

Figure 4A:
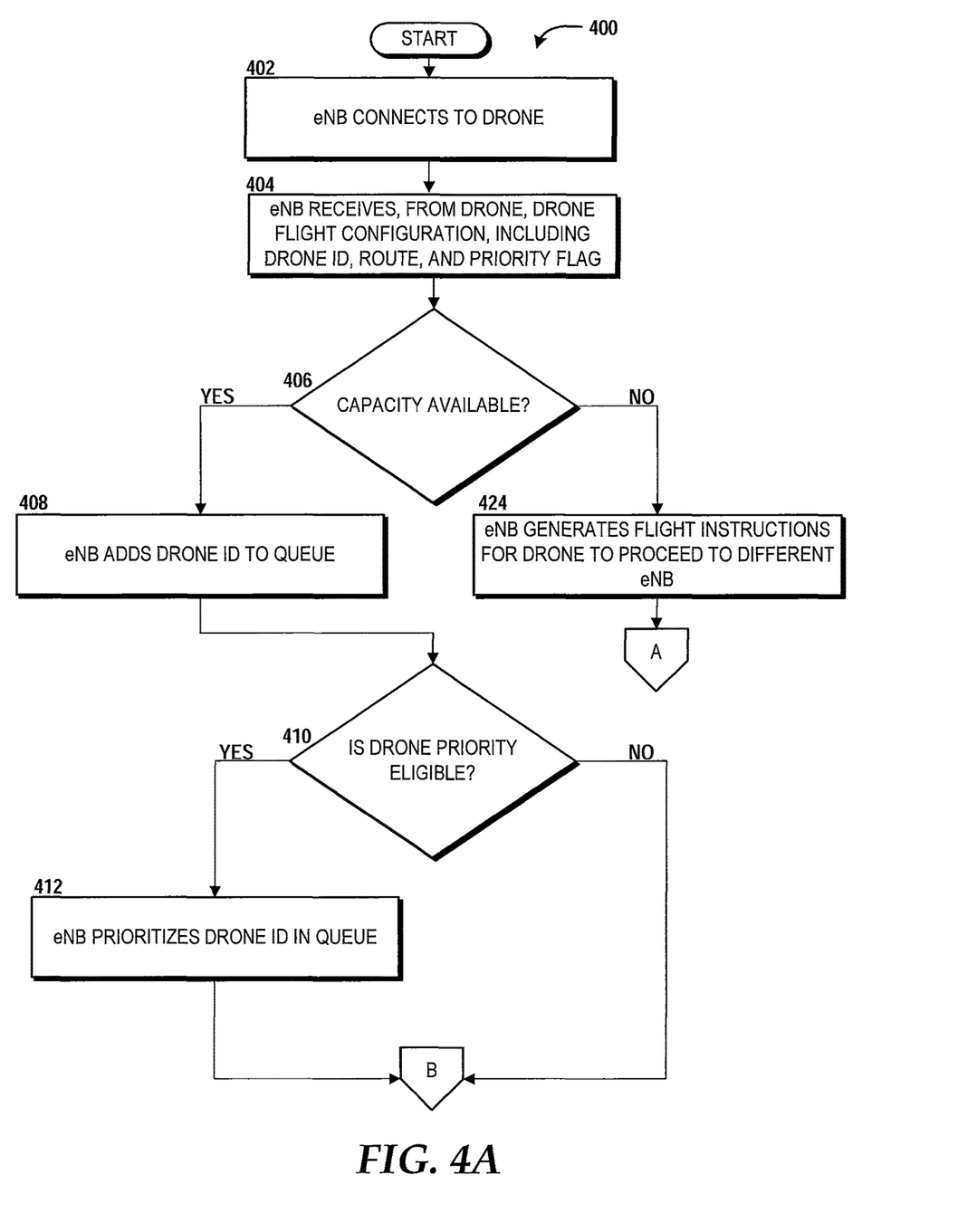
FIGS. 4A-4B are flow diagrams illustrating aspects of a method for operating an eNB, according to an illustrative embodiment of the concepts and technologies disclosed herein.
Figure 4B:
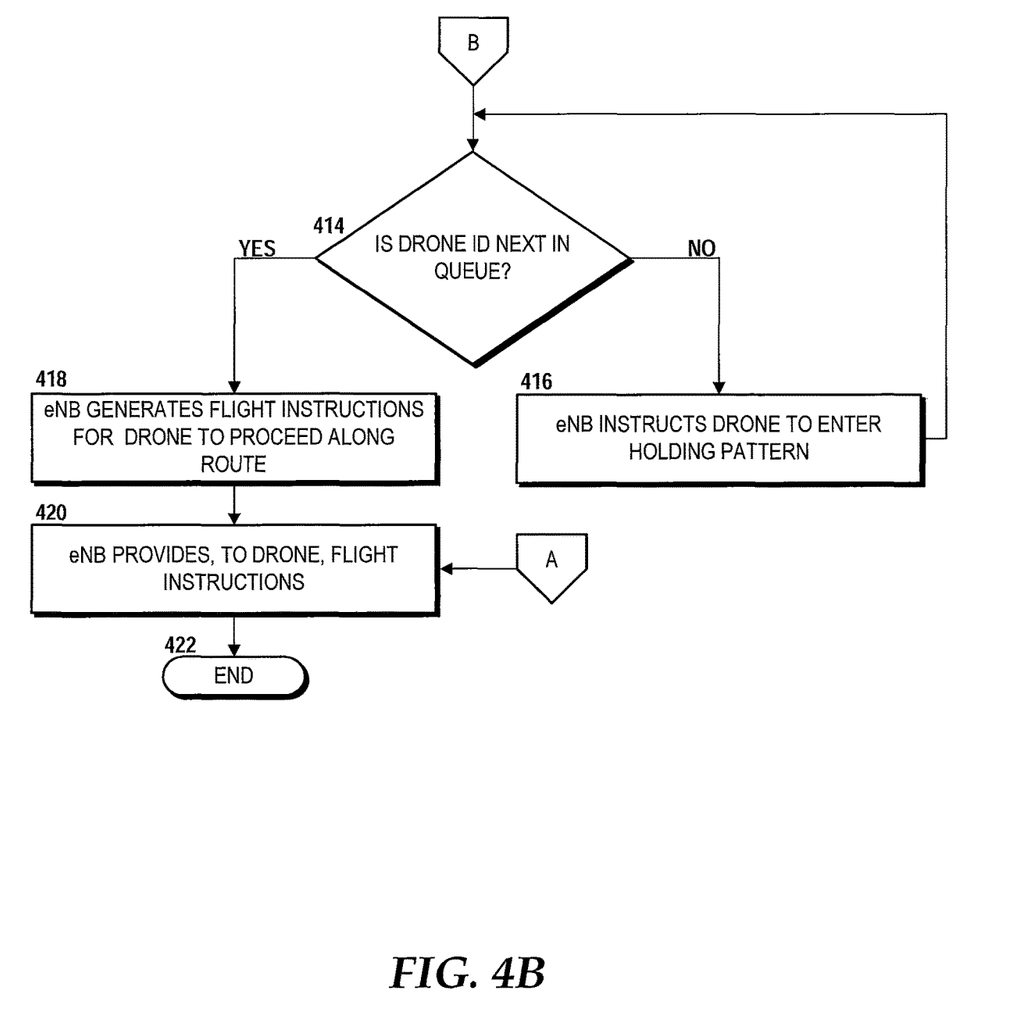

Turning now to FIG. 4, and first to FIG. 4A, a method 400 for operating an eNB, such as one of the eNBs 110, will be described, according to an illustrative embodiment. The method 400 will described with reference to FIG. 4 and further reference to FIG. 1.

The method 400 begins and proceeds to operation 402, where the eNB 110 connects to the drone 102. From operation 402, the method 400 proceeds to operation 404, where the eNB 110 receives, from the drone 102, the drone flight configuration 118, including the drone ID 120, the drone route 122, and the priority flag 124.

From operation 404, the method 400 proceeds to operation 406, where the eNB 110 determines whether capacity is available to accommodate the drone 102 in the airspace 108. If the eNB 110 determines that capacity is available, the method 400 proceeds to operation 408, where the eNB 110 adds the drone ID 120 to the drone queue 138. From operation 408, the method 400 proceeds to operation 410, where the eNB 110 determines whether the drone 102 is priority eligible based upon the priority flag 124. If the eNB 110 determines that the drone 102 is priority eligible, the method 400 proceeds to operation 412, where the eNB 110 prioritizes the drone ID 120 in the drone queue 138. From operation 412, the method 400 proceeds to operation 414, which is shown in FIG. 4B. Also, if, at operation 410, the eNB 110 determines that the drone 102 is not priority eligible, the method 400 proceeds directly to operation 414.

At operation 414, the eNB 110 determines whether the drone ID 120 is next in the drone queue 138. If the eNB 110 determines that the drone ID 120 is not next in the drone queue 138, the method 400 proceeds to operation 416, where the eNB 110 instructs, via the flight instructions 140, the drone 102 to enter a holding pattern. From operation 416, the method 400 returns to operation 414. If the eNB 110 determines that the drone ID 120 is next in the drone queue 138, the method 400 proceeds to operation 418, where the eNB 110 generates the flight instructions 140 for the drone 102 to proceed along the drone route 122. From operation 418, the method 400 proceeds to operation 420, where the eNB 110 provides, to the drone 102, the flight instructions 140. From operation 420, the method 400 proceeds to operation 422, where the method 400 ends.

Returning to FIG. 4A, and particularly, to operation 406, the method 400 proceeds to operation 424, where the eNB 110 generates the flight instructions 140 for the drone 102 to proceed to a different eNB (e.g., the $eNB_2$ 110B or the $eNB_N$ 110N). From operation 424, the method 400 returns to FIG. 4B, and particularly, to operation 420, where the eNB 110 provides the flight instructions 140 to the drone 102. From operation 420, the method 400 proceeds to operation 422, where the method 400 ends.

Figure 5:
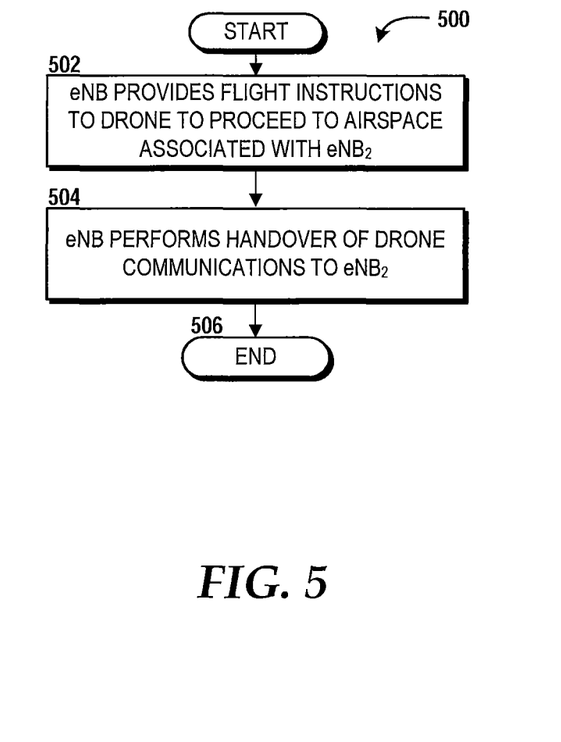
FIG. 5 is a flow diagram illustrating aspects of a method for an eNB handover process for managing a drone, according to an illustrative embodiment of the concepts and technologies disclosed herein.

Turning now to FIG. 5, a flow diagram illustrating aspects of a method 500 for an eNB handover process, such as the drone $HO_1$ 142A, for managing a drone, such as the drone 102, will be described, according to an illustrative embodiment. The method 500 will described with reference to FIG. 5 and further reference to FIG. 1. The method 500 begins and proceeds to operation 502, where the $eNB_1$ 110A provides the flight instructions 140 to the drone 102 to proceed to the $eNB_2$ airspace 108B associated with the $eNB_2$ 110B. From operation 502, the method 500 proceeds to operation 504, where the eNB 110 performs the drone $HO_1$ 142A to the $eNB_2$ 110B. From operation 504, the method 500 proceeds to operation 506, where the method 500 ends.

Figure 6:
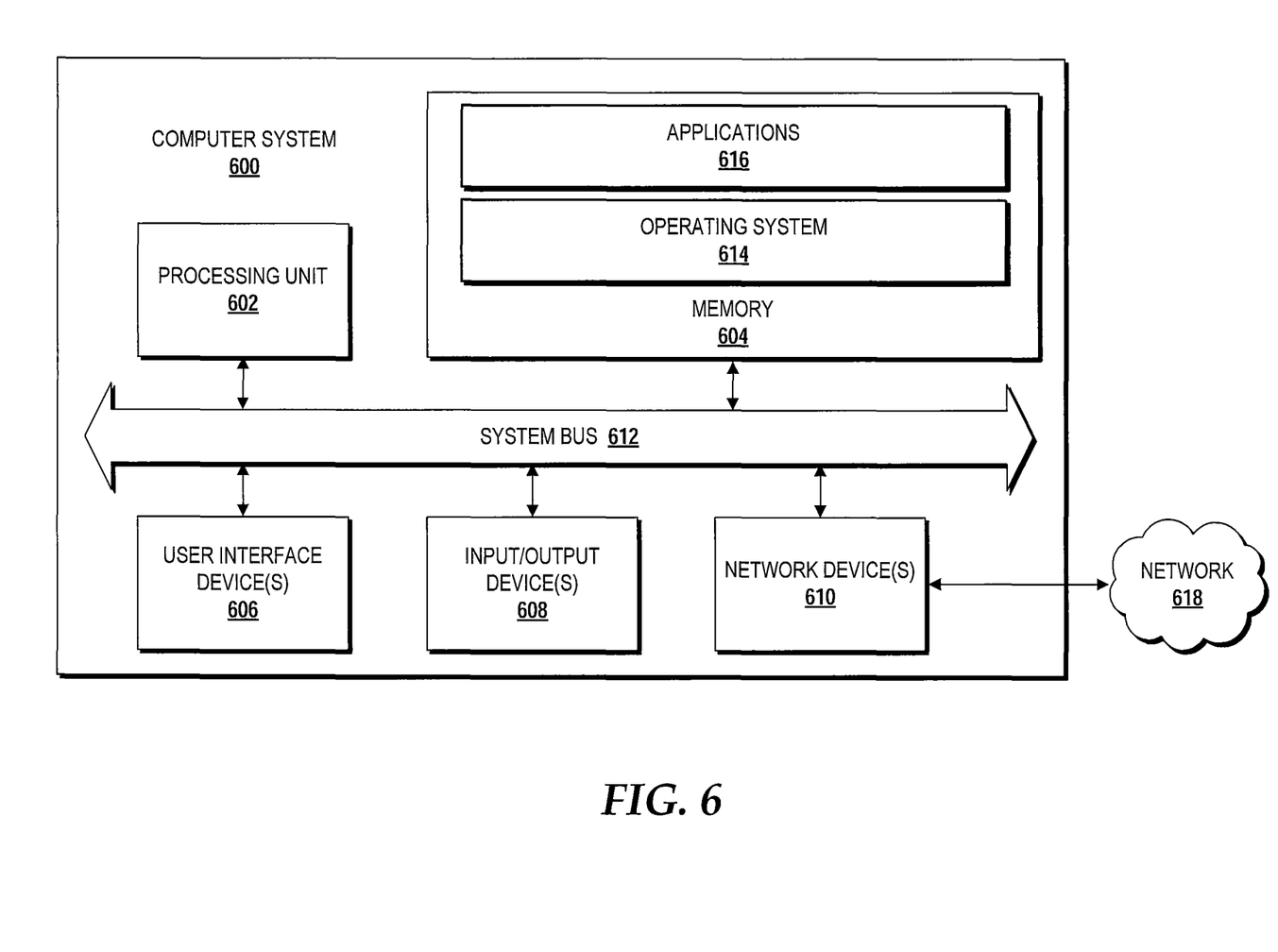
FIG. 6 is a block diagram illustrating an example computer system capable of implementing aspects of the embodiments presented herein.

Turning now to FIG. 6, a block diagram illustrating a computer system 600 configured to perform various operations disclosed herein. The computer system 600 includes a processing unit 602, a memory 604, one or more user interface devices 606, one or more input/output ("I/O") devices 608, and one or more network devices 610, each of which is operatively connected to a system bus 612. The system bus 612 enables bi-directional communication between the processing unit 602, the memory 604, the user interface devices 606, the I/O devices 608, and the network devices 610. In some embodiments, one or more components of the RAN 112, the eNBs 110A-108N, the EPC network 144, one or more components of the PDN 146, the drone origin system 114, the drone destination system 126, or some combination thereof is/are configured, at least in part, like the computer system 600. It should be understood, however, that one or more components of the RAN 112, the eNBs 110A-108N, the EPC network 144, one or more components of the PDN 146, the drone origin system 114, and/or the drone destination system 126 may include additional functionality or include less functionality than now described.

The processing unit 602 may be a standard central processor that performs arithmetic and logical operations, a more specific purpose programmable logic controller ("PLC"), a programmable gate array, or other type of processor known to those skilled in the art and suitable for controlling the operation of the computer system 600. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more applications 616.

The operating system 614 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 606 may include one or more devices with which a user accesses the computer system 600. The user interface devices 606 may include, but are not limited to, computers, servers, personal digital assistants, telephones (e.g., cellular, IP, or landline), or any suitable computing devices. The I/O devices 608 enable a user to interface with the program modules. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a WLAN such as a WI-FI network, a WWAN, a wireless PAN ("WPAN") such as BLUETOOTH, or a wireless MAN ("WMAN"). Alternatively, the network 618 may be a wired network such as, but not limited to, a WAN such as the Internet, a LAN such as the Ethernet, a wired PAN, or a wired MAN. The network 618 can be or can include the RAN 112, the EPC network 144, and/or the PDN 146.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the drone 102, the eNBs 110, the drone origin system 114, or the drone destination system 126 described herein. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion. In light of the above, it should be appreciated that many types of physical transformations may take place in the drone 102, the eNBs 110, the drone origin system 114, or the drone destination system 126 in order to store and execute the software components presented herein.

Figure 7:
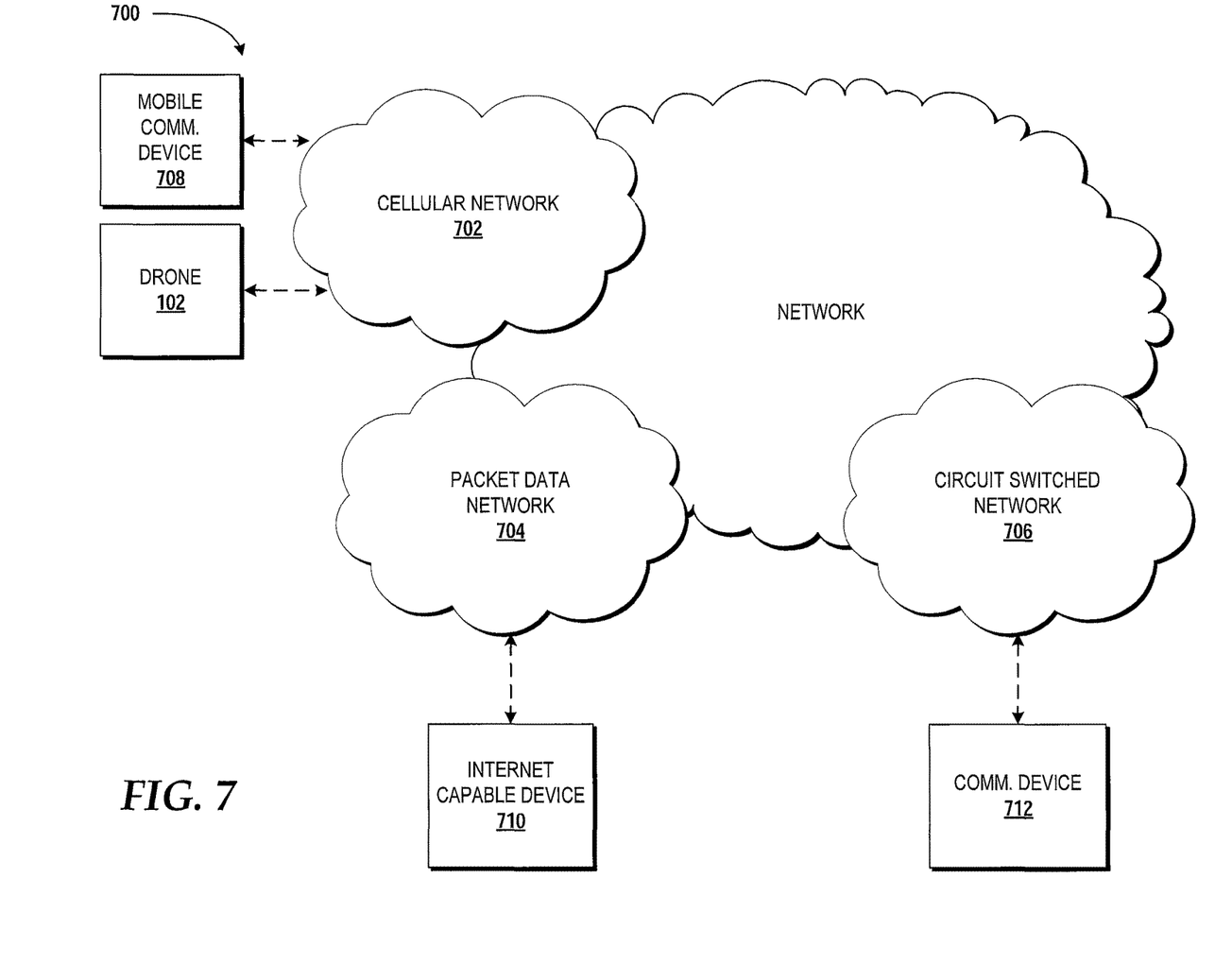
FIG. 7 is a diagram illustrating a network, according to an illustrative embodiment.

Turning now to FIG. 7, details of a network 700 are illustrated, according to an illustrative embodiment. The network 700 includes a cellular network 702 (e.g., the RAN 112 and the EPC network 144), a packet data network 704 (e.g., the PDN 146), and a circuit switched network 706 (e.g., a public switched telephone network). The network 700 can include the operating environment 100 illustrated and described with reference to FIG. 1.

The cellular network 702 includes various components such as, but not limited to, BTSs, NBs or eNBs (e.g., the eNBs 110A-110N), base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, visitor location registers ("VLRs"), charging platforms, billing platforms, voicemail platforms, GPRS core network components, location service nodes, and the like. The cellular network 702 also includes radios and nodes for receiving and transmitting voice, data, and combinations thereof to and from radio transceivers, networks, the packet data network 704, and the circuit switched network 706. A mobile communications devices 708 and the drone 102 can communicate with the cellular network 702.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 can include the PDN 146. The packet data network 704 includes various devices, for example, servers, computers, databases, and other devices in communication with another, as is generally known. In some embodiments, the packet data network 704 is or includes one or more WI-FI networks, each of which can include one or more WI-FI access points, routers, switches, and other WI-FI network components. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system ("POTS"). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, the drone 102, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710.

Based on the foregoing, it should be appreciated that concepts and technologies for intelligent drone traffic management via a RAN have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:

1. A first network node, comprising:
   a processor; and
   a memory that stores executable instructions that, when executed by the processor, facilitate performance of operations, comprising:
      receiving, from a drone device, a flight configuration for the drone device,
      wherein the flight configuration comprises a drone route and priority data associated with the drone device;
      determining whether to add the drone device to a queue of drone devices awaiting use of a first airspace associated with the first network node based on a current number of drone devices operating in the first airspace;
      generating flight instructions based on the determining, wherein the generating comprises:
         in response to determining not to add the drone device to the queue, generating the flight instructions to comprise a first instruction for the drone device to leave the first airspace and proceed to a second airspace associated with a second network node; and
      transmitting the flight instructions to the drone device.

2. The first network node of claim 1, wherein the operations further comprise performing a handover of communications with the drone device to the second network node.

3. The first network node of claim 1, wherein the operations further comprise:
   providing network connectivity to the drone device; and
   in response to determining to add the drone device to the queue:
      adding the drone device to the queue; and
      generating the flight instructions to comprise a second instruction for the drone device to enter a holding pattern in a designated portion of the first airspace when the drone device is not next in the queue,
   wherein:
      the flight instructions are transmitted to the drone device to cause flight of the drone device based on the flight instructions, and
      an order of the drone device in the queue is based on the priority data.

4. The first network node of claim 1, wherein the determining comprises determining to add the drone device to the queue in response to the current number of drone devices being less than a threshold number, and in response to determining to add the drone device to the queue, generating the flight instructions to comprise a second instruction for the drone device to fly, in accordance with the drone route, through at least a portion of the first airspace and to the second airspace associated with the second network node.

5. The first network node of claim 4, wherein the flight configuration further comprises an identifier associated with the drone device, and the determining to add the drone device comprises adding the identifier associated with the drone device to the queue, and wherein the operations further comprise:
   determining that the drone device is priority eligible based on the priority data; and
   prioritizing the drone device in the queue in response to the determining that the drone device is priority eligible.

6. The first network node of claim 1, wherein:
   the drone route comprises data indicative of a drone origin, a drone destination, and one or more locations en route from the drone origin to the drone destination,
   the data comprises a respective range of latitude coordinates, a respective range of longitude coordinates, and a respective range of altitudes for each of the one or more locations, the drone origin is associated with a drone origin system for providing the flight configuration to the drone device, and the drone destination is associated with a drone destination system for receiving a flight summary associated with the drone route from the drone device.

7. A method comprising:

providing, by a first network node comprising a processor, network connectivity to a drone device;

receiving, by the first network node from the drone device, a flight configuration for the drone device, wherein the flight configuration comprises a drone route associated with the drone device;

generating, by the first network node, flight instructions to facilitate flight of the drone device based on the flight configuration and a current number of drone devices operating in a first airspace associated with the first network node, wherein the generating comprises:

in response to determining not to add the drone device to a queue of drone devices awaiting use of the first airspace, generating the flight instructions to comprise instructions for the drone device to leave the first airspace and proceed to a second airspace associated with a second network node; and transmitting, by the first network node, the flight instructions to the drone device to cause the flight of the drone device based on the flight instructions.

8. The method of claim 7, further comprising determining, by the first network node, whether to facilitate the flight of the drone device in the first airspace in accordance with the drone route based on the current number of drone devices operating in the first airspace, wherein the flight instructions are generated based on the determining.

9. The method of claim 8, wherein the flight configuration further comprises priority data associated with the drone device, and wherein the determining further comprises determining whether to add the drone device to the queue of drone devices awaiting use of the first airspace based on the priority data.

10. The method of claim 7, further comprising performing, by the first network node, a handover of communications with the drone device to the second network node, wherein the flight instructions cause the flight of the drone device along a route different from the drone route of the flight configuration, and wherein the flight configuration comprises a preflight flight configuration programmed in the drone device.

11. A non-transitory machine-readable medium comprising executable instructions that, when executed by a processor of network node equipment, facilitate performance of operations, comprising:

providing network connectivity to a drone device;

determining not to add the drone device to a queue of drone devices awaiting use of an airspace based at least on a current number of drone devices operating in the airspace;

generating flight instructions to facilitate flight of the drone device based on a drone route, priority data associated with the drone device, and the current number of drone devices operating in the airspace, wherein the flight instructions comprise instructions for the drone device to leave the airspace and proceed to other network node equipment other than the network node equipment; and transmitting the flight instructions to the drone device to cause the flight of the drone device based on the flight instructions.

12. The non-transitory machine-readable medium of claim 11, wherein the operations further comprise:

receiving, by the network node equipment from the drone device, the drone route when the drone device has arrived in the airspace;

determining that the drone device is priority eligible based on the priority data; and prioritizing the drone device in a queue in response to determining that the drone device is priority eligible.

13. The non-transitory machine-readable medium of claim 11, wherein the operations further comprise performing a handover of communications with the drone device to the other network node equipment.

14. The non-transitory machine-readable medium of claim 11, wherein the network node equipment comprises a cellular base station.

15. The first network node of claim 1, wherein the first network node comprises an eNodeB.

16. The method of claim 7, wherein the first network node comprises an eNodeB.

17. The first network node of claim 1, wherein the first network node comprises a cellular base station.

18. The method of claim 7, wherein the fisrt network node comprises a cellular base station.

19. The method of claim 7, wherein the drone device is a fixed-wing aircraft.

20. The method of claim 7, wherein the drone device is a rotary-wing aircraft.

* * * * *